United States Patent [19]

Miyamoto et al.

[11] Patent Number: 4,566,350
[45] Date of Patent: Jan. 28, 1986

[54] LEVER ASSEMBLY

[75] Inventors: Issei Miyamoto, Yokohama; Yuichi Kato, Tokyo, both of Japan

[73] Assignee: Ohi Seisakusho Co., Ltd., Yokohama, Japan

[21] Appl. No.: 573,624

[22] Filed: Jan. 25, 1984

[30] Foreign Application Priority Data

Jan. 27, 1983 [JP] Japan ............................... 58-9081[U]
Oct. 15, 1983 [JP] Japan ........................... 58-159577[U]
Oct. 15, 1983 [JP] Japan ........................... 58-159578[U]

[51] Int. Cl.$^4$ ........................ G05G 1/04; F16C 11/00
[52] U.S. Cl. .................................... 74/526; 74/522.5;
74/519; 16/381; 16/363; 16/360; 403/71;
403/243; 403/70; 403/113; 292/DIG. 38;
292/DIG. 53
[58] Field of Search ...................... 74/519, 522.5, 526;
24/682; 403/407, 71, 70, 243, 113, 117;
292/DIG. 38, DIG. 53; 16/381, 382, 360, 363

[56] References Cited

FOREIGN PATENT DOCUMENTS

| 2641339 | 3/1977 | Fed. Rep. of Germany . |
| 2233863 | 1/1975 | France .................... 292/DIG. 38 |
| 2308818 | 11/1976 | France ...................... 403/71 |
| 2393902 | 1/1979 | France . |
| 58-29715 | 6/1983 | Japan . |
| 1497170 | 1/1978 | United Kingdom . |

Primary Examiner—Kenneth J. Dorner
Attorney, Agent, or Firm—Schwartz, Jeffery, Schwaab, Mack, Blumenthal & Evans

[57] ABSTRACT

Herein disclosed is a lever assembly which comprises generally two parts, which are lever holder and a lever proper. The lever holder has at its one side a tubular portion which is lockably fitted in an opening formed in a door panel, while, the lever proper has at its one side a hollow shaft portion which is lockably but pivotally received in the tubular portion.

22 Claims, 14 Drawing Figures

LEVER ASSEMBLY

BACKGROUND OF THE INVENTION

1. Field of the Invention

The present invention relates in general to a device for transmitting a motion from one member to the other, and more particularly to a pivotal lever which is interposed between driving and driven members and which links them through respective connecting rods.

2. Description of the Prior Art

In a door lock system employed in a motor vehicle, there is known an arrangement in which the linkage between a locking knob mounted on a door window frame and a door lock assembly mounted in the free end portion of the door is achieved through a pivot lever which is pivotally mounted to a panel of the door. Usually, the lever, which takes the form of a bellcrank lever, has two spaced arm portions to which respective connecting rods from the locking knob and the door lock assembly are pivotally connected, so that the motion of the locking knob induces a pivotal movement of the lever and thus operation of the door lock assembly.

However, some of the conventional pivot levers practically employed in the above-mentioned field, fail to exhibit their calculated functions because of their inherent constructions. Viz., some of them are bulky in construction, and thus, when mounted in the door, tend to interfere with other mechanisms mounted therein. Furthermore, some are of a onepiece type having a shaft portion rotatably received in an opening formed in the door panel. This type lever, however, increases the chances that the arm portions thereof engage frictionally with the door panel upon pivotal movement thereof, thereby producing undesirable wear of the lever and/or the door panel.

SUMMARY OF THE INVENTION

It is therefore an essential object of the present invention to provide a lever assembly which is compact, readily produced and assembled and which is free of the above-mentioned problem wherein the lever undesirably contacts the door panel.

According to the present invention, there is provided a lever assembly mounted on a panel and interposed between driving and driven devices to link the members through respective connecting rods, the lever assembly comprising a lever holder including a tubular portion of which the outer diameter is substantially equal to that of a circular opening formed in the panel and an annular base portion which is integral and concentric with the tubular portion, a lever having first and second arms which are respectively linked to the driving and driven members through the rods, the lever having at its one side a hollow shaft portion of which outer diameter is substantially equal to the inner diameter of the tubular portion of the lever holder, first means for providing a locking connection between the tubular portion and the panel when the tubular portion is finally put in the opening of the panel, second means for providing a locking connection between the hollow shaft portion and the tubular portion while permitting rotation of the hollow shaft portion relative to the lever holder when the hollow shaft portion is finally put in the tubular portion of the lever holder, and third means for suppressing excess rotation of the hollow shaft portion of the lever relative to the tubular portion of the lever holder.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the lever assembly according to the present invention will be described with reference to the drawings. The description is directed to a lever assembly which is mounted to an automotive door for operatively linking a door lock knob (not shown) mounted on a door window frame and a door lock assembly (not shown) mounted in the free end portion of the door.

Figure 1:
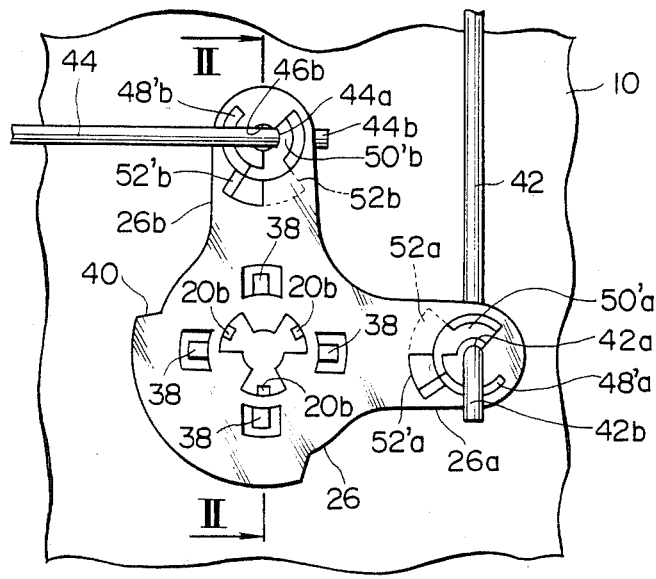
FIG. 1 is a plan view of a lever assembly according to the present invention, the assembly being shown mounted to a door inner panel.
Figure 2:
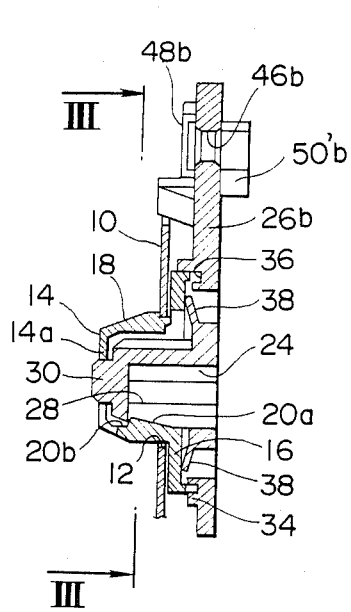
FIG. 2 is a sectional view taken along the line II—II of FIG. 1.
Figure 3:
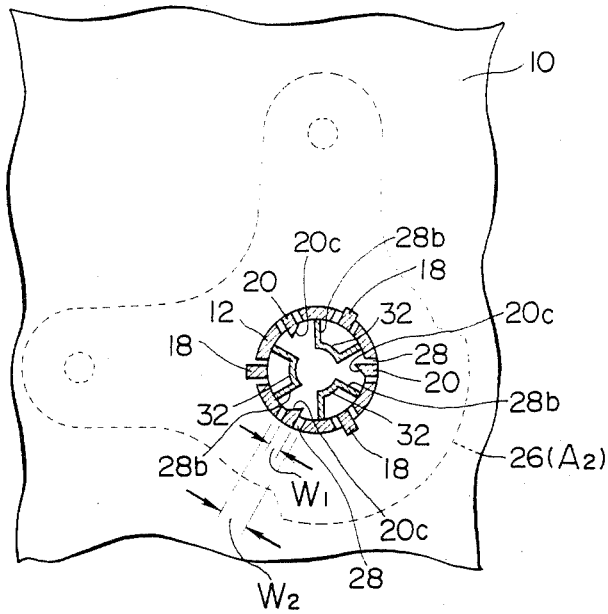
FIG. 3 is a sectional view taken along the line III—III of FIG. 2.

As is seen from FIGS. 1 to 3, an inner panel 10 of the door is formed at a suitable portion thereof with a circular opening 12 (see FIG. 2) with which the lever assembly of the invention, more particularly, a lever holder (A₁) of the assembly is mated.

Figure 5:
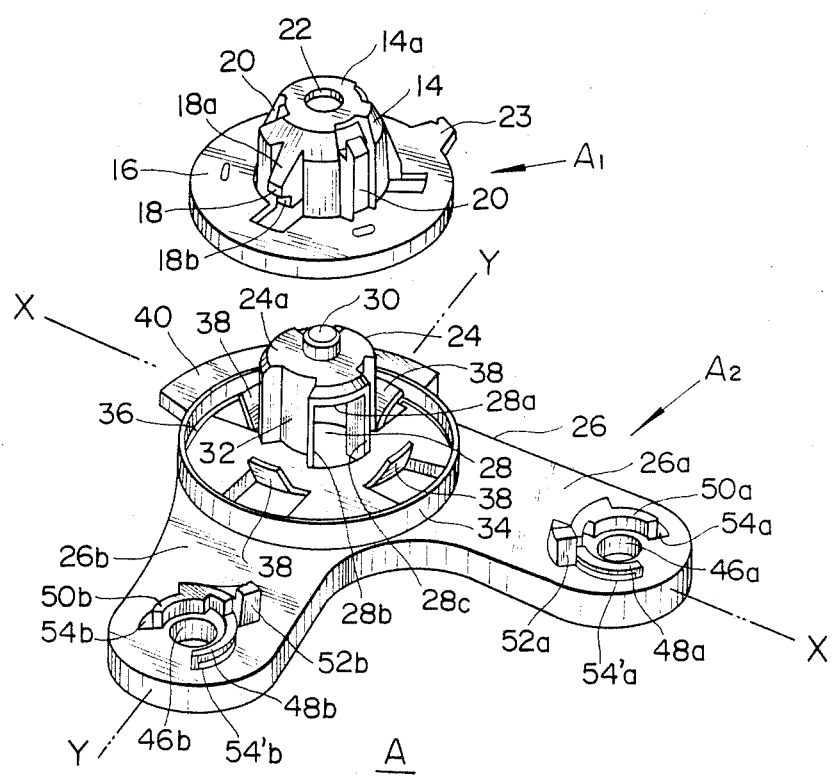
FIG. 5 is an exploded view of the lever assembly.
Figure 6:
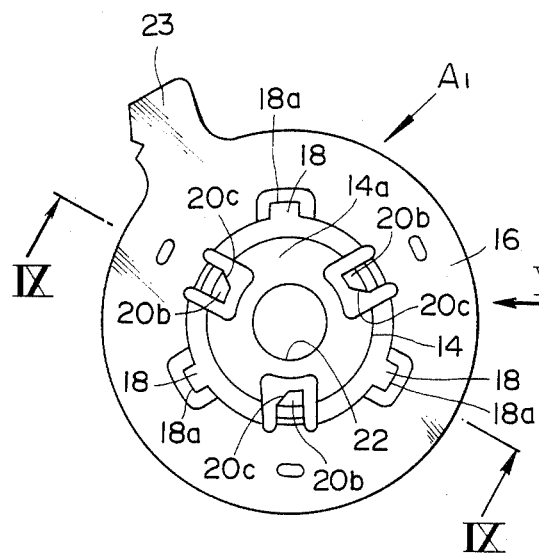
FIG. 6 is a plan view of a lever holder which is a part of the lever assembly.
Figure 7:
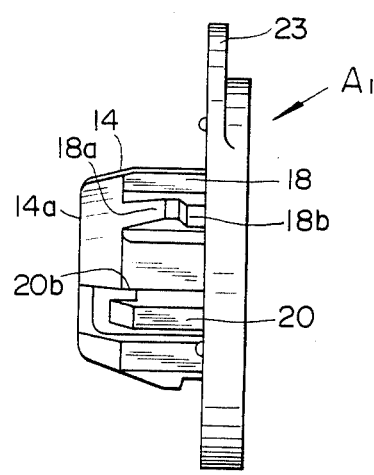
FIG. 7 is a side view of the lever holder shown in FIG. 6, the view being taken from the direction of the arrow VII.
Figure 8:
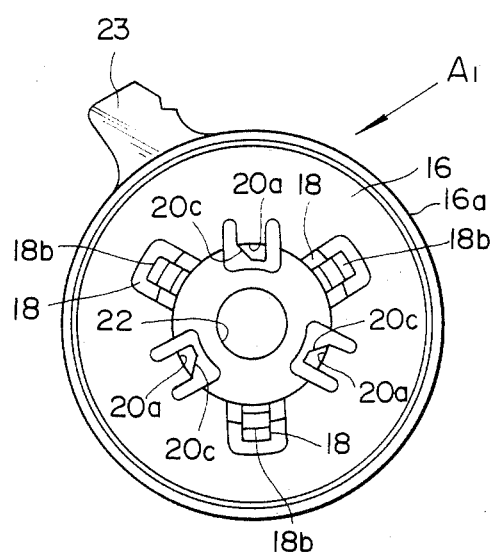
FIG. 8 is a back view of the lever holder of FIG. 6.

As is best shown in FIG. 5, the lever assembly "A" of the invention comprises generally two parts, which are a lever holder A₁ lockably fitted to the opening 12 of the door panel 10, and a bellcrank lever A₂ removably fitted to the lever holder A₁.

The lever holder A₁ is constructed of, for example, a plastics having a suitable resiliency, such as polyacetal. The lever holder A₁ comprises a tubular portion 14 lockably received in the opening 12 of the door panel 10 and an annular base portion 16 which are integral and concentric with each other. The outer diameter of the tubular portion 14 is substantially equal to the diameter of the panel opening 12 so that the tubular portion 14 can be set in the opening 12 without play.

As is seen from FIGS. 5 to 9, the tubular portion 14 is formed with a first set of pawls 18 (three in number in the disclosed embodiment) which are arranged radially symmetrically about the axis of the tubular portion 14. Each first pawl 18 is provided by forming in the tubular portion 14 parallel slits (no numerals) and in the annular base portion 16 near the central opening of the same a rectangular opening (no numeral), so that each pawl 18 extends from a head portion 14a of the tubular portion 14 toward the annular base portion 16 perpendicular thereto. As is best seen from FIG. 5, each first pawl 18 is formed with an inclined outer surface 18a which is gradually raised radially outwardly from the outer surface of the tubular portion 14 as the distance from the head portion 14a of the tubular portion 14 increases. The inclined surface 18a terminates near the leading end of the pawl 18 thereby to provide thereto a stepped portion 18b. Each stepped portion 18b is sized to correspond to the thickness of the panel 10 to which the lever assembly "A" of the invention is mounted. The inner surfaces of the first set of pawls 18 are substantially coincident with the cylindrical inner surface of the tubular portion 14. As will become apparent as the description proceeds, the inclined surfaces 18a and the stepped portions 18b function to facilitate and assure lockable fitment of the lever holder $A_1$ in the opening 12 of the door panel 10.

The tubular portion 14 is further formed with a second set of pawls 20 (three in number in the disclosed embodiment) which are arranged radially symmetrically about the axis of the tubular portion 14 so as to be interdigitted with the first set of pawls 18. Each second pawl 20 is provided by forming in the tubular portion 14 parallel slits (no numerals) and in the head portion 14a of the tubular portion 14 a rectangular opening (no numeral), so that each second pawl 20 extends from the annular base portion 16 toward the head portion 14a perpendicular to the annular base portion 16. As is seen from FIGS. 2 and 9, each second pawl 20 is formed with an inclined inner surface 20a which is gradually raised radially inwardly from the inner surface of the tubular portion 14 as the distance from the annular base portion 16 increases. The inclined surface 20a terminates near the leading end of the pawl 20 thereby to provide thereto a stepped portion 20b. Another inclined surface 20c is formed on the inwardly raised portion of each second pawl 20, which is inclined in the tangential direction with respect to the cylindrical inner surface of the tubular portion 14. As will become clear hereinafter, the inclined surfaces 20c function to facilitate disconnection of the lever $A_2$ from the lever holder $A_1$.

The head portion 14a of the tubular portion 14 is of a wall which closes the leading end of the tubular portion 14. The head wall 14a is formed at its central portion with a small circular opening 22.

Figure 9:
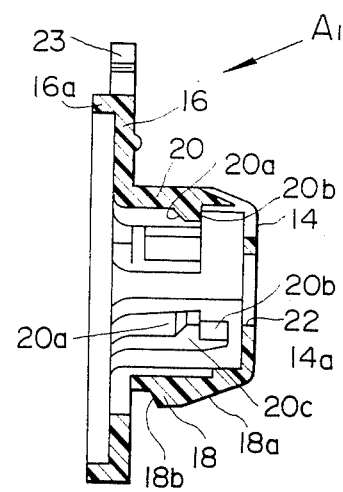
FIG. 9 is a sectional view taken along the line IX—IX of FIG. 6.

As is best shown in FIG. 9, the annular base portion 16 is formed, at a side opposite to the side on which the tubular portion 14 stands, with an annular ridge 16a which is concentric with the tubular portion 14. The annular base portion 16 is formed at its periphery with a projection 23.

As is seen from FIGS. 1 to 5 and 10 to 12, especially FIG. 5, the bellcrank lever $A_2$ is constructed of the same material as the afore-mentioned lever holder $A_1$, that is, for example, polyacetal. The lever $A_2$ comprises a hollow shaft portion 24 lockably but rotatably received in the tubular portion of the lever holder $A_1$ and an L-shaped lever portion 26 having first and second arms 26a and 26b, the hollow shaft portion 24 and the lever portion 26 being integral with each other. The outer diameter of the hollow shaft portion 24 is substantially equal to the inner diameter of the tubular portion 14 of the lever holder $A_1$, so that the hollow shaft portion 24 is rotatably received in the tubular portion 14 upon final fitment of the bellcrank lever $A_2$ to the lever holder $A_1$.

As is best seen from FIG. 5, the hollow shaft portion 24 is formed with a plurality of rectangular openings 28 (three in number in the disclosed embodiment) which are arranged radially symmetrically about the axis of the hollow shaft portion 24. Each rectangular opening 28 is rimmed by flanges 28a, 28b and 28c which extend radially outwardly with respect to the axis of the hollow shaft portion 24. As will become apparent as the description proceeds, upon fitment of the bellcrank lever $A_2$ to the lever holder $A_1$, the flange 28a of each rectangular opening 28 is slidably engaged with the stepped portion 20b of the associated second pawl 20 to prevent disconnection of the lever $A_2$ from the lever holder $A_1$. As is seen from FIG. 3, the distance ($W_2$) between the circumferentially spaced flanges 28b and 28c of each rectangular opening 28 is greater than the thickness ($W_1$) of each second pawl 20, so that, upon fitment of the lever $A_2$ to the lever holder $A_1$, the lever $A_2$ can rotate about the axis of the lever holder $A_1$ by a certain angle determined by abutment of the inwardly raised portion 20a of each second pawl 20 with either the flange 28b or the flange 28c.

The head portion of the hollow shaft portion 24 is of a wall 24a which closes the leading end of the portion 24. The head wall 24a is formed at its central portion with a circular stud 30 of which diameter is substantially equal to the diameter of the circular opening 22 of the lever holder $A_1$. Upon fitment of the lever $A_2$ to the lever holder $A_1$, the stud 30 is slidably received in the circular opening 22 to assure the pivotal movement of the lever $A_2$ relative to the lever cover $A_1$.

The provision of the flanges 28b and 28c of each rectangular opening 28 provides the hollow shaft portion 24 with three axially extending grooves 32 which are arranged radially symmetrically about the axis of the hollow shaft portion 24.

The L-shaped lever portion 26 of the lever $A_2$ is formed about the hollow shaft portion 24 with a circular ridge 34 along and within which a circular groove 36 is formed. In the zone surrounded by the circular groove 36, there are formed a plurality of resilient projections 38 (four in number in the disclosed embodiment) which are arranged radially symmetrically about the axis of the shaft portion 24 and project toward the side on which the hollow shaft portion 24 stands. Upon fitment of the lever $A_2$ to the lever holder $A_1$, the circular groove 36 of the lever $A_2$ receives the annular ridge 16a of the lever holder $A_1$, and the resilient projections 38 of the lever $A_2$ resiliently contact with the back surface (that is, the surface opposite to the surface on which the tubular portion 24 stands) of the annular base portion 16 of the lever holder $A_1$. The lever portion 26 is formed at a periphery of the circular ridge 34 with a crest-shaped projection 40. This projection 40 functions to cover the projection 23 of the lever holder $A_1$ upon fitment of the lever $A_2$ to the lever holder $A_1$.

As is seen from FIG. 1, the first arm 26a is pivotally connected to a rod 42 which extends to a conventional door lock knob (not shown) mounted on the door window frame, while the second arm 26b is pivotally connected to another rod 44 which extends to a conventional door lock assembly mounted in the free end portion of the door. For these pivotal connections, each rod 42 or 44 has a crank-shaped end which comprises right-angled first and second sections 42a or 44a and 42b or 44b. The form of the crank-shaped end of the rod may be clearly understood from FIGS. 12, 13 and 14.

For assuring easy and reliable pivotal connection between the rod 42 or 44 and the arm 26a or 26b, the following measure is applied to both the arms 26a and 26b in the same way. Thus, for facilitation of the description, the following explanation will be made only with respect to the measure applied to the first arm 26a. In fact, the rod connecting construction of the second arm 26b is substantially the same as that of the first arm 26a. Thus, for ease of understanding and description, parts or portions formed on the first arm 26a will be indicated by the addition of the letter "a" after each numeral, while those formed on the second arm 26b will be indicated by the addition of the letter "b" after each corresponding numeral. Furthermore, since each arm 26a or 26b has substantially identical constructions on both sides thereof, the explanation will be directed to only the construction formed on one side of the first arm 26a. The parts and portions formed on the other side of the first arm 26a will be indicated by putting a dash after each corresponding numeral.

As is clearly shown in FIG. 5, the first arm 26a is formed at its leading end portion with a circular opening 46a of which diameter is substantially equal to that of the rod 42 (or 44). On the selected side (the side shown in the drawing) of the first arm 26 is formed an arc-shaped platform 48a which is positioned at a location somewhat distant from the opening 46a. As may be understood from FIGS. 11 and 12, the platform 48a (which has the same construction as the platform 48'b shown in the drawings) is formed like a bridge so that is has a suitable resiliency. A semicircular wall portion 50a is formed near the opening 46a at a location opposite to the platform 48a with respect to the opening 46a. The height of the wall portion 50a is greater than that of the platform 48a and the semicylindrical surface of the wall portion 50a is concentric with the opening 46a. A projection or stopper 52a is formed at a location distant from the opening. It is to be noted that the parts 48a, 50a and 52a formed on the shown side of the first arm 26a and the corresponding parts 48'a, 50'a and 52'a formed on the other side of the same are symmetrically arranged with respect to the longitudinal axis "X" of the arm 26a. Designated by numeral 54a (or 54'a) is a depression which is formed behind the semicircular wall portion 50a to extrude or produce, upon moulding, the bridge-shaped platform 48b on the other side of the arm 26a. As is seen from FIG. 1, upon fitment of the rod 42 to the first arm 26a, the platform 48a resiliently supports the major section of the rod 42, the opening 46a receives the first section 42a of the rod 42 and the other platform 48'a resiliently supports the second section 42b of the rod 42. The semicircular wall portions 50a and 50'a function to assure the connection between the first section 42a of the rod 42 and the opening 46a of the arm 26a, while the stoppers 52a and 52'a function to suppress excess pivotal movement of the rod 42 relative to the arm 26a.

In the following, assemblying procedure of the lever assembly "A" to the door inner panel 10 will be described with reference to FIGS. 1 to 5, especially FIG. 5.

First, the lever holder A₁ is attached to the panel 10 by making the tubular portion 14 thereof fit in the opening 12 of the panel 10. By the provision of the first set of pawls 18 each having both the radially outwardly raised portion 18a and the stepped end portion 18b, the fitment is made in a so-called snap action manner. Upon final fitment, the stepped end portions 18b of the pawls 18 spread out and engage with the peripheral edge of the opening 12 so that the lever holder A₁ is lockably fitted to the door panel 10.

Then, the bellcrank lever A₂ is attached to the lever holder A₁ by making the hollow shaft portion 24 thereof fit in the tubular portion 14 of the lever holder A₁. This fitment is carried out in such a manner that the flanges 28a of the rectangular openings 28 are associated with the second set of pawls 20 of the lever holder A₁. Thus, during insertion of the hollow shaft portion 24 into the tubular portion 14, each flange 28a of the shaft portion 24 comes to engagement with the inwardly inclined surface 20a of the corresponding second pawl 20 and spreads out the same, riding over the inwardly raised portion 20a and finally falls in the stepped portion 20b to engage the same. With this, the inwardly raised portions 20a of the second pawls 20 of the lever holder A₁ become positioned inboard of the flanges 28a of the hollow shaft portion 24 and slidably engage the same. Thus, the bellcrank lever A₂ is prevented from disconnection from the lever holder A₁ which has been fitted to the door panel 10. By the dimensional difference between the thickness W₁ of each second pawl 20 and the distance W₂ between the circumferentially spaced flanges 28b and 28c of each rectangular opening 28 as mentioned hereinabove, the bellcrank lever A₂ can rotate or pivot relative to the lever holder A₁ by the predetermined angle. That is to say, the lever A₂ can rotate from an extreme angular position where one of the flanges 28b and 28c of the hollow shaft portion 24 is in abutment with the inwardly raised portion 20a of the corresponding second pawl 20 to another extreme angular position where the other flange 28c or 28b is in abutment with the raised portion 20a.

Figure 4:
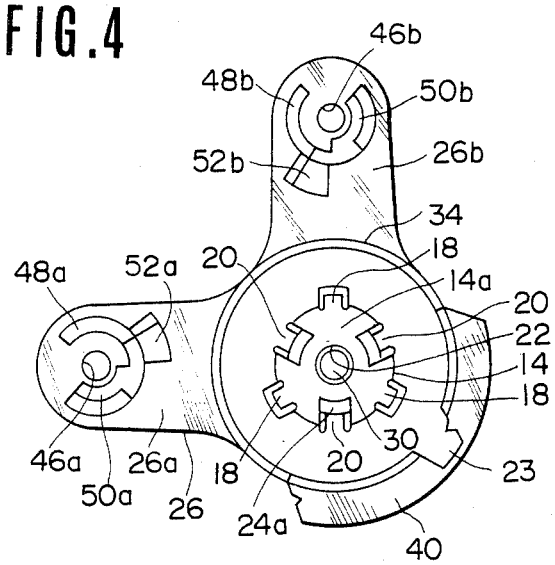
FIG. 4 is a back view of the lever assembly.

It is now to be noted that the fitment of the lever A₂ to the lever holder A₁ is so made that the crest-shaped projection 40 covers the projection 23 of the lever holder A₁, as is understood from FIG. 4. Furthermore, if desired, the fitment of the lever A₂ to the lever holder A₁ may be carried out before the fitment of the lever holder A₁ to the door inner panel 10.

In the following, the procedure for disconnecting the lever A₂ from the lever holder A₁ will be described with reference to FIG. 3 which is a sectional view taken along the line III—III of FIG. 2.

Upon requirement of the disconnection, the lever A₂ is strongly rotated in the counterclockwise direction (that is, in the clockwise direction in FIG. 1) relative to the lever holder A₁. Preferably, this rotation is made by holding the projection 23 of the lever holder A₁ with a suitable tool. During this movement, the flange 28b of each rectangular opening 28 of the hollow shaft portion 24 comes to engagement with the tangentially inclined surface 20c of the corresponding second pawl 20 of the lever holder A₁. Further rotation of the lever A₂ causes the flange 28b to spread out the associated second pawl 20. Thus, finally, the inwardly raised portion 20a of the second pawl 20 rides over the flange 28b and falls into the adjacent axially extending groove 32. Since the groove 32 has no objections thereon as is seen from FIG. 5, the lever A₂ can be easily disconnected from the lever holder A₁ by only pulling out the same.

Figure 10:
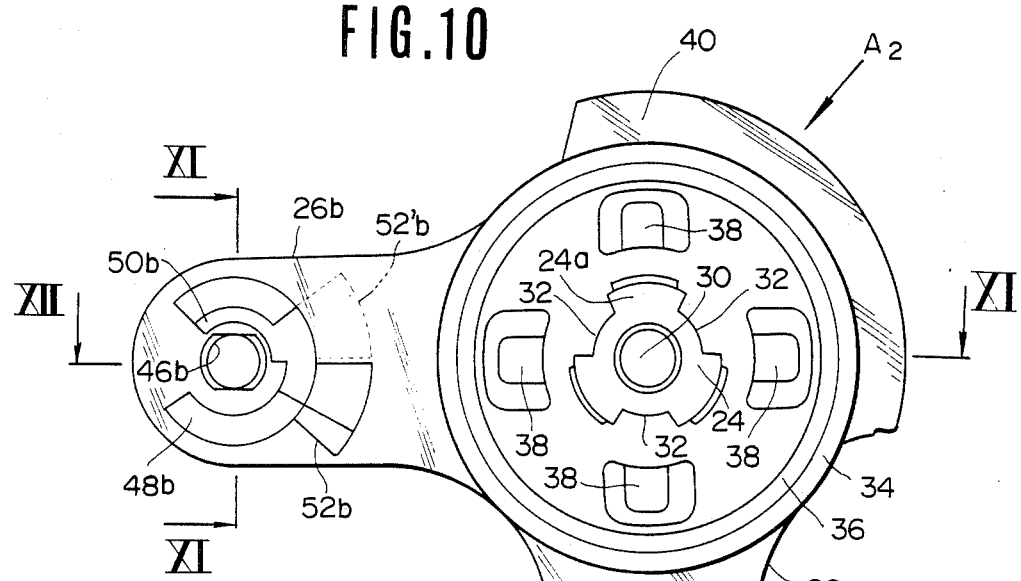
FIG. 10 is a plan view of a lever proper which is another part of the lever assembly of the invention.
Figure 11:
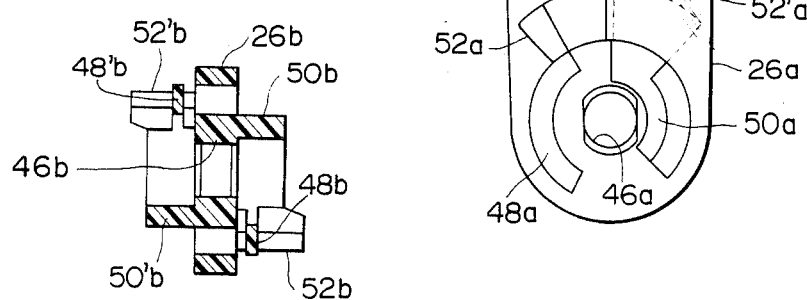
FIG. 11 is a sectional view taken along the line XI—XI of FIG. 10.

In the following, procedure for connecting the rod 44 (see FIG. 1) to the second arm 26b of the lever A₂ will be described with reference to FIG. 12 which is a sectional view taken along the line XII—XII of FIG. 10. It is to be noted that in FIG. 12, the door inner panel 10 (not shown in this drawing) is positioned below the shown article.

Figure 12:
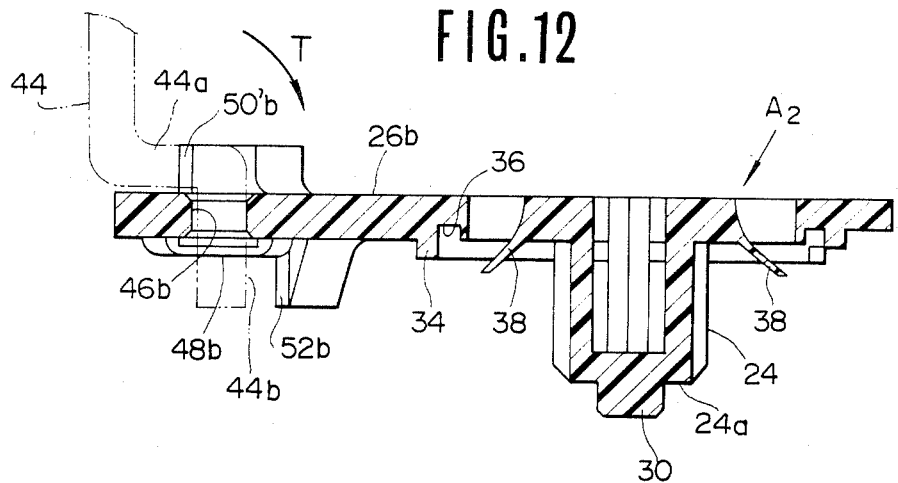
FIG. 12 is a sectional view taken along the line XII—XII of FIG. 10.
Figure 13:
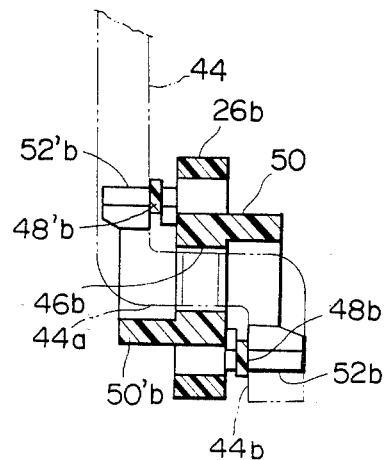
FIGS. 13 and 14 are views similar to FIG. 11, but showing respective conditions wherein a rod is pivotally connected to the lever proper.

First, the second section 44b of the rod 44 is inserted in the opening 46b from the upper side of the shown article, having the first section 44a laid between the resilient platform 48'b and the semicircular wall 50'b, in a manner as shown in FIG. 12. In this condition, the first section 44a of the rod 44 extends generally parallel with the longitudinal axis Y (see FIG. 5) of the second arm 26b. Then, the rod 44 is inclined by about 90 degrees toward the hollow shaft portion 24 (that is in the direction of the arrow T) and then turned toward this side as viewed in FIG. 12 by about 90 degrees. With this, the first section 44a of the rod 44 is properly mated with the opening 46b of the second arm 26b in such a manner as shown in FIG. 13, completing the pivotal connection between the second arm 26b and the rod 44. Thus, the rod 44 is pivotal relative to the second arm 26b by an angle determined by an abutment of the rod 44 (that is, the major portion of the rod 44 or the second section 44b) with either the stopper 52'b or the stopper 52b.

Figure 14:
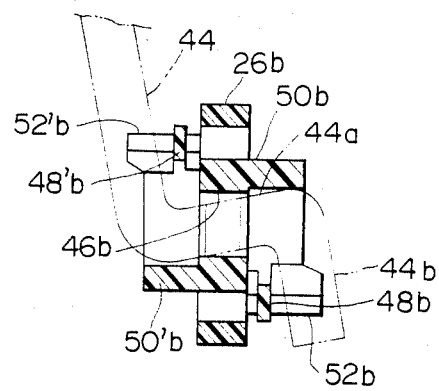

When now, the rod 44 is applied with an external force and thus inclined in a way as shown in FIG. 14, the first section 44a of the rod 44 is brought into engagement with the semicircular wall portions 50b and 50b' thereby preventing the further inclination of the rod 44 relative to the second arm 26b. Thus, undesired disconnection of the rod 44 from the second arm 26b is assuredly prevented.

Disconnection of the rod 44 from the second arm 26b of the lever $A_2$ is carried out by taking a procedure reversed to the above.

The procedures for connecting and disconnecting the other rod 42 to and from the first arm 26a of the lever $A_2$ are substantially the same as those mentioned hereinabove.

ADVANTAGES OF THE PRESENT INVENTION

With the construction of the lever assembly "A" as stated hereinabove, the following advantages are provided.

(1) The lever assembly "A" can be easily mounted to the door inner panel 10. In fact, as is stated hereinabove, the fitment of the lever assembly "A" to the panel 10 can be effected by simply putting each part into the associated part in order without using any fastening means such as bolts and nuts.

(2) Since the bulky parts (such as the tubular portion 14 of the lever holder $A_1$ and the hollow shaft portion 24 of the lever $A_2$, etc.,) of the lever assembly A are concentrated at one side of the lever assembly A, the other side of the same can be constructed substantially flat. Thus, upon fitment of the lever assembly A to the door inner panel 10, the assembly A does not interfere with any mechanisms or parts lying on the door inner panel 10.

(3) Since the connection of the bellcrank lever $A_2$ to the door inner panel 10 is made through the lever holder $A_1$ in a manner as mentioned hereinabove, the lever $A_2$ does not directly contact with the panel 10. Thus, the pivotal movement of the lever $A_2$ does not cause formation of any scratches on the panel 10.

(4) Since the second pawls 20 of the lever holder $A_1$ are formed with the tangentially inclined surfaces 20c, the disconnection of the lever $A_2$ from the lever holder $A_1$ is easily carried out in the manner as is mentioned hereinabove. This feature is very convenient when inspection of the installed lever assembly A is carried out.

(5) Since each arm 26a or 26b of the lever $A_1$ is formed about the rod connecting opening 46a or 46b with the semicylindrical wall portions 50a and 50'a or 50b and 50'b, the unexpected disconnection of the rod 42 or 44 from the associated arm 26a or 26b does not occur during its assembling procedure by the reason as mentioned hereinbefore. Furthermore, by the provision of the stoppers 52a and 52'a or 52b and 52'b, excess rotation of the rod 42 or 44 relative to the associated arm 26a or 26b is suppressed. This feature facilitates the work for mounting the lever assembly A to the panel 10.

In the following, modifications applicable to the above-mentioned embodiment will be described.

(1) Although, in the disclosed embodiment, it is described that the second pawls 20 are equipped to the lever holder $A_1$ and the flanges 28a of the rectangular openings 28 are equipped to the lever $A_2$, it is also possible to provide the second pawls and the flanges to the lever $A_2$ and the lever holder $A_1$ respectively so long as the afore-mentioned slidable engagement therebetween is obtained.

(2) If desired, the lever holder $A_1$ may be provided with a conventional stopper for stopping rotation of the holder $A_1$ relative to the door inner panel 10.

What is claimed is:

1. A lever assembly mounted on a panel for linking driving and driven device through connecting rods, comprising:
   a lever holder which includes a tubular portion inserted through an opening of the panel, the outer diameter of the lever holder being substantially equal to the diameter of said opening, and further including an annular base portion integral with and concentrically disposed on an open end of said tubular portion;
   a lever which includes a hollow shaft portion inserted in said tubular portion of said lever holder, the outer diameter of said hollow shaft being substantially equal to the inner diameter of said tubular portion, and further including first and second arms linked to driving and driven devices through connecting rods;
   first means for providing a locking connection between said tubular portion of said lever holder and the panel;
   second means for providing a locking connection between said hollow shaft portion of said lever and said tubular portion of said lever holder while permitting rotation of said hollow shaft portion relative to said lever holder; and
   third means for suppressing excess rotation of said hollow shaft portion of said lever relative to said tubular portion of said lever holder by contacting a portion of said lever with a portion of said lever holder.

2. A lever assembly as claimed in claim 1, wherein said first means comprises:
   first pawls defined by said tubular portion of the leve holder, each first pawl extending from a head portion of said tubular portion toward the annular base portion perpendicular thereto and having an inclined outer surface which is gradually raised radially outwardly form the outer surface of the tubular portion with increasing distance from said head portion and terminates near said open end of said tubular portion to form thereto a stepped portion having an inner surface, whereby, upon completion of fitment of said lever holder to said panel, the stepped portions are lockably engaged with the peripheral edge of said opening of the panel.

3. A lever assembly as claimed in claim 2, in which said first pawls are arranged radially symmetrically about the axis of said tubular portion, each pawl being provided by forming in the tubular portion parallel slits and in the annular base portion near the central opening of the same a rectangular opening.

4. A lever assembly as claimed in claim 3, in which the stepped portion of each first pawl is sized to correspond to the thickness of said panel.

5. A lever assembly as claimed in claim 4, in which the inner surfaces of said first pawls are substantially coincident with the cylindrical inner surface of the tubular portion.

6. A lever assembly as claimed in claim 1, in which said second means comprises:

second pawls defined by said tubular portion of the lever holder, each second pawl extending from the annular base portion toward a head portion of the tubular portion perpendicular to the annular base portion and having an inclined inner surface which is gradually raised radially inwardly from the inner surface of the tubular portion with increase in distance from the annular base portion and terminates near the leading end thereof thereby to form thereto a stepped portion; and radially outwardly extending first flanges formed on said hollow shaft portion of the lever, whereby, upon completion of fitment of said hollow shaft portion to said tubular portion, the stepped portions of said second pawls are lockably engaged with the flanges, respectively.

7. A lever assembly as claimed in claim 6, in which said second pawls are arranged radially symmetrically about the axis of said tubular portion, each second pawl being provided by forming in the tubular portion parallel slits and in the head portion of the tubular portion a rectangular opening.

8. A lever assembly as claimed in claim 7, in which said radially outwardly extending first flanges are arranged radially symmetrically about the axis of said hollow shaft portion.

9. A lever assembly as claimed in claim 8, in which each of said first flanges extends perpendicular to the axis of said hollow shaft portion.

10. A lever assembly as claimed in claim 6, in which said third means comprises:

a portion of said inclined inner surface of each second pawl; and circumferentially spaced second and third flanges formed on said hollow shaft portion of said lever, said second and third flanges being separated from each other by a distance greater than the thickness of the portion of said inclined inner surface, whereby, upon completion of fitment of said hollow shaft portion to said tubular portion, said portion is located between said second and third flanges and permitted to pivotally move within a zone defined by said flanges.

11. A lever assembly as claimed in claim 10, in which each first flange, each second flange and each third flange are arranged to form a rim of one of rectangular openings formed in said hollow shaft portion.

12. A lever assembly as claimed in claim 11, in which said rectangular openings are arranged radially symmetrically about the axis of the hollow shaft portion.

13. A lever assembly as claimed in claim 12, in which said second and third flanges extend radially outwardly with respect to the axis of said hollow shaft portion.

14. A lever assembly as claimed in claim 1, wherein said tubular portion of said lever holder is formed at the end opposite said open end with a circular opening and in which said hollow shaft portion of said lever includes a circular stud, whereby, upon completion of fitment of said hollow shaft portion to said tubular portion, said circular stud is rotatably received in said curcular opening.

15. A lever assembly as claimed in claim 14, in which said annular base portion of said lever holder is formed at its periphery with a projection, and in which said lever is formed at its periphery with a crest-shaped projection, whereby, upon completion of fitment of said lever to said lever holder, said crest-shaped projection covers said projection of the annular base portion.

16. A lever assembly as claimed in claim 1, in which each of said first and second arms has at its leading end portion a rod connecting means which comprises:

a circular opening formed through said arm for receiving therein an end portion of the connecting rod;

an arc-shaped resilient platform formed on a selected side of said arm at a position somewhat distant from said circular opening:

a semicircular wall portion formed on said selected side of said arm near said circular opening at a position opposite to said platform with respect to the circular opening; and a stopper projection formed on said selected side of said arm at a position distant from said circular opening, whereby, upon completion of fitment of the rod to said arm, said platform resiliently supports a portion of the rod, said semicircular wall portion suppresses excess inclination of said rod with respect to the axis of said circular opening of said arm, and said stopper projection suppresses excess rotation of said rod about the axis of said circular opening.

17. A lever assembly as claimed in claim 16, in which the height of said wall portion is greater than that of said platform and in which said wall portion has a semicylindrical inner surface concentric with said circular opening of the arm.

18. A lever assembly as claimed in claim 17, in which the other side of said arm has substantially the same construction in the rod connecting means as the selected side, the parts formed on the other side being symmetrically arranged with respect to the longitudinal axis of the arm.

19. A lever assembly as claimed in claim 10, in which said portion of said inclined inner surface of each second pawl is formed with another inclined surface which is inclined in the tangential direction with respect to the cylindrical inner surface of said tubular portion of said lever holder.

20. A lever assembly mounted on a panel for linking driving and driven devices through connecting rods, comprising:

a lever holder which includes a tubular portion inserted through an opening of the panel, the outer diameter of the lever holder being substantially equal to the diameter of said opening, and further including an annular base portion integral with and concentrically disposed on an open end of said tubular portion;

a lever which includes a hollow shaft portion inserted in said tubular portion of said lever holder, the outer diameter of said hollow shaft being substantially equal to the inner diameter of said tubular portion, and further including first and second arms linked to driving and driven devices through connecting rods;

first means for providing a locking connection between said tubular portion of said lever holder and the panel;

second means for providing a locking connection between said hollow shaft portion of said lever and said tubular portion of said lever holder while permitting rotation of said hollow shaft portion relative to said lever holder;

thrid means for suppressing excess rotation of said hollow shaft portion of said lever relative to said tubular portion of said lever holder by contacting a portion of said lever with a portion of said lever holder; and forth means for biasing said lever away from said lever holder.

21. A lever assembly as claimed in claim 20, wherein said fourth means comprises a plurality of resilient projections arranged on said lever about the axis of said hollow shaft portion for resiliently contacting said annular base portion of said lever holder.

22. A lever assembly as claimed in claim 21, wherein said resilient projections are radially and symmetrically positioned about the axis of said hollow shaft portion.

* * * * *